Figures 1, 2, 3:
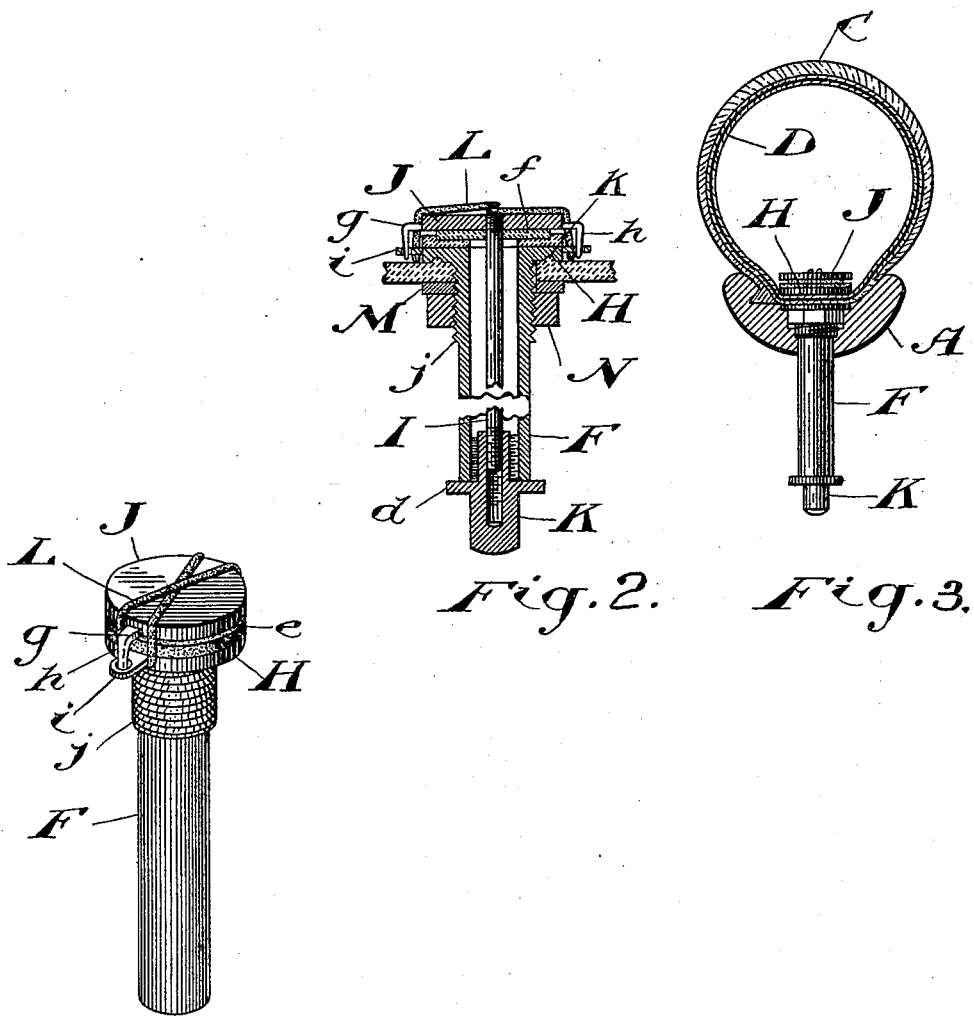

No. 640,815. Patented Jan. 9, 1900.
E. S. RONEY.
VALVE FOR INFLATION.
(Application filed Mar. 27, 1899.)

(No Model.)

Witnesses
J. J. Colbourne.
N. C. Dickson.

Inventor
Edward S. Roney
by Ridout & Maybee
Attys

UNITED STATES PATENT OFFICE.

EDWARD S. RONEY, OF TORONTO, CANADA.

VALVE FOR INFLATION.

SPECIFICATION forming part of Letters Patent No. 640,815, dated January 9, 1900.

Application filed March 27, 1899. Serial No. 710,662. (No model.)

*To all whom it may concern:*

Be it known that I, EDWARD S. RONEY, merchant tailor, of the city of Toronto, in the county of York and Province of Ontario, Canada, have invented certain new and useful Improvements in Valves for Pneumatic Tires, of which the following is a specification.

The object of this invention is to provide an easy-working air-tight valve for pneumatic tires; and with this object in view the invention consists in the peculiar construction, combination, and arrangement of parts hereinafter more particularly described and then definitely claimed.

In the accompanying drawings, Figure 1 is a cross-section of a tire, showing my valve in position. Fig. 2 is an enlarged sectional elevation of the valve. Fig. 3 is a perspective view of the valve with the washer, nut, and cap removed.

In the drawings like letters of reference indicate corresponding parts in the different figures.

With my tire I use a valve which, while very easy to operate, can be made entirely air-proof when the tire is in use.

Referring now to the details of the drawings by letters, F is a hollow valve-stem provided at its inner end with a flange H.

I is a rod extending through the hollow stem and provided at its upper end with a disk J. Secured to the flange H is a ring $e$, of rubber or other suitable packing material. $f$ is a disk of similar material cemented or otherwise secured to the under side of the disk J. This disk is preferably of smaller diameter than the ring $e$, so that when the two are pressed together the edges of the disk sink into the substance of the ring. It is found that when two disks of similar diameter are pressed together their edges tend to curve outward, affording an entrance-point for air under pressure. By constructing the disk and ring as indicated I entirely obviate this difficulty. The outer end of the rod I is screw-threaded, so that a similarly-threaded cap K may be screwed thereon. This cap is provided with a flange $d$, which engages the end of the hollow stem F. It is found that by screwing this cap the disk and the flange H may be drawn tightly together and the disk $f$ and the ring $e$ caused to form an air-tight joint, as previously described. Formed on or secured to opposite sides of the disk J are projections $g$, one or more of which are provided with downwardly-projecting spikes $h$. Formed on or secured to opposite sides of the flange H are projections $i$, having holes formed therein, into which the spikes enter, as indicated.

L is a rubber band passing under the projections $i$ and crossed over the top of the disk J. More than one rubber band may be used, if desired, and they may be engaged in any desired way with the projections to accomplish the result desired, which is to normally tend to draw the disk and flange together with a spring-pressure. This rubber band tends to prevent the disk J from turning on the flange H when the cap K is screwed up, and in most cases it will be found sufficient for that purpose; but the spikes $h$ are preferably used in addition.

In order to connect the valve to the tire, I insert the stem through a hole in the same, place a washer M over the stem, and screw up tightly the nut N, which is threaded to engage the large threaded portion $j$ of the stem F. The under side of the flange H is preferably provided with an annular recess $k$, as shown, into which the rubber of the tire is forced, thus making the connection between the valve and the tire absolutely air-tight. The inside of the end of the valve-stem is preferably threaded for engagement with an air-pump. When pumping up the tire, the disk J lifts slightly and permits air to enter the tire, the rubber spring L closing it on the return stroke of the air-pump. It will be found that the valve operates so easily that a small boy or girl can pump up the tire with a small hand-pump with the greatest possible ease. When the tire is pumped up, by screwing up the cap, as previously described, the valve can be made absolutely air-tight. By unscrewing the cap and pressing with it upon the end of the rod I the disk J may be lifted and the tire deflated at any time.

What I claim as my invention is—

1. In a tire a valve comprising a hollow valve-stem; and a flange formed on or connected to the head of the said stem, in combination with a rod extending through the said hollow stem; a disk connected to the said rod above the aforesaid flange, projections extending out from the flange and disk; one or more elastic bands engaging the said projections and tending to draw the disk and flange together and also to prevent them turning upon one another, and means engaging the outer ends of the stem and rod whereby the disk and flange may be tightened together, substantially as and for the purpose specified.

2. In a tire a valve comprising a hollow valve-stem, a flange formed on or connected to the head of the said stem, and a ring of packing secured to the upper surface of the said flange, in combination with a rod extending through the said hollow stem; a disk connected to the said rod above the aforesaid flange; a disk of packing of less diameter than the aforesaid ring secured to the under side of the said disk on the rod; projections extending out from the flange and disk; one or more elastic bands engaging the said projections and tending to draw the disk and flange together, and also to prevent them turning upon one another, and means engaging the outer ends of the stem and rod whereby the disk and flange may be tightened together, substantially as and for the purpose specified.

3. In a tire a valve comprising a hollow valve-stem and a flange formed on or connected to the head of the said stem, in combination with a rod extending through the said hollow stem; a disk connected to the said rod above the aforesaid flange; a projection from each side of the disk and flange, one of the projections on the disk or flange being provided with a spike adapted to enter a suitable hole in the corresponding projection on the flange or disk; one or more elastic bands adapted to draw the flange and disk together; and means engaging the outer ends of the stem and rod whereby the disk and flange may be tightened together, substantially as and for the purpose specified.

4. In a tire a valve comprising a hollow valve-stem; a flange formed on or connected to the head of the said stem; and a ring of packing secured to the upper surface of the said flange, in combination with a rod extending through the said hollow stem; a disk connected to the said rod above the aforesaid flange; a disk of packing of less diameter than the aforesaid ring secured to the under side of the said disk on the rod, one or more elastic bands engaging the disk and flange, and tending to draw them together; and means engaging the outer ends of the stem and rod whereby the disk and flange may be tightened together, substantially as and for the purpose specified.

Toronto, Canada, March 18, 1899.

EDWARD S. RONEY.

In presence of—
  J. EDW. MAYBEE,
  N. C. DICKSON.